March 8, 1927.

B. W. JONES

ELECTROMAGNETIC DEVICE

Filed Nov. 12, 1921

1,620,556

Inventor:
Benjamin W. Jones,
by Albert G. Davis
His Attorney.

Patented Mar. 8, 1927.

1,620,556

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

ELECTROMAGNETIC DEVICE.

Application filed November 12, 1921. Serial No. 514,569.

My invention relates to devices for automatically opening a polyphase circuit upon the opening of one or more of its phases and more particularly for opening the circuit to an electric motor operating upon a polyphase circuit to prevent the motor from running on less than the normal number of phases.

Many devices for accomplishing this general result have been suggested, none of which, however, is entirely satisfactory, since none takes care of all conditions which may arise. The most usual forms of this device depend for their operation upon the use of shunt coils which, upon the failure of one of the phases, are intended to open the motor circuit. Any device of this character is inherently defective, since it cannot operate to stop the motor if the open circuit occurs while the motor is running. The coils being connected across the phases, an opening of any phase will not deenergize the coils, since they must remain energized either from the motor or from the generator depending upon where the break occurs. Of course, if the break occurs while the motor is standing still the coils cannot be energized from the motor, and, if the open circuit occurs between the coils and the generator the coils will not be energized when the power is applied. Since an open circuit is liable to occur while the motor is running, such devices are obviously only a partial protection. Devices of this nature, operated by series coils, have been proposed for obviating the above defects of shunt coil devices, and, in certain of its aspects, my invention is directed to improvements in series coil devices of this nature.

In carrying out my invention I employ series windings, a member operated thereby to open the circuit when one of the phases is opened, and a magnetic element which cooperates with the windings and the member to effect operation of the member upon phase failure. The nature of my device is such that when it is connected to a three-phase circuit, for instance, a movement of the member in one direction will result, but, when one phase is open thereby leaving a single-phase circuit, the member will be moved in the opposite direction due to the single-phase circuit and open the three-phase circuit.

Figure 1:
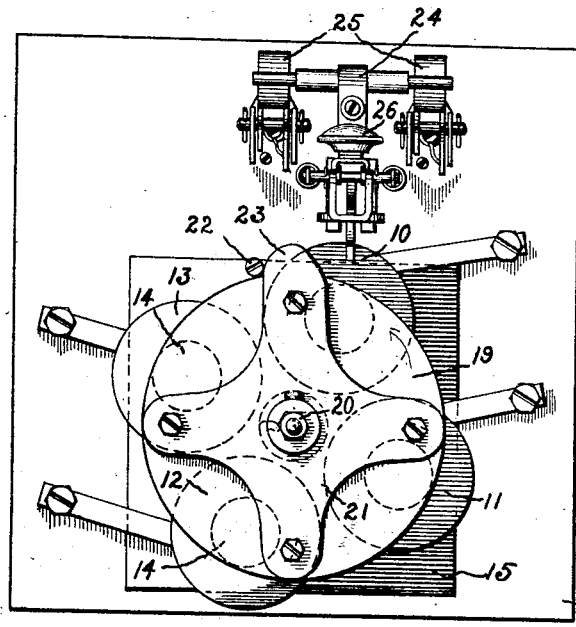
Figure 2:
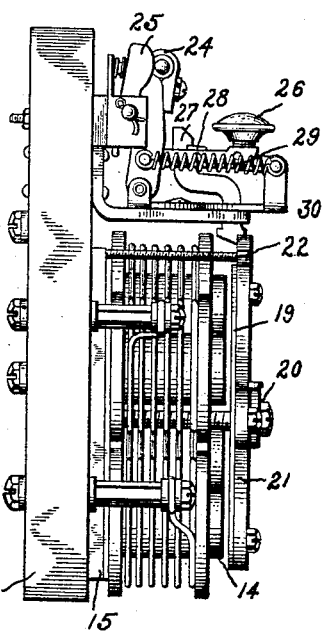
Figure 3:
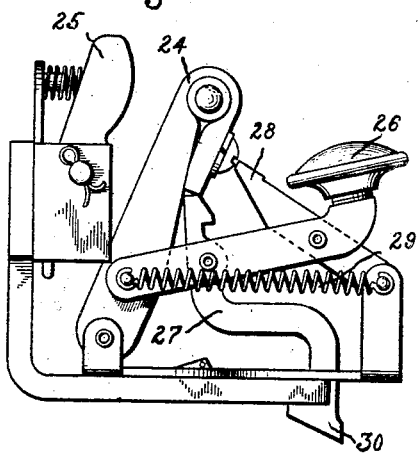

In the accompanying drawing illustrating one embodiment of my invention in concrete form, Fig. 1 is a plan view of my device; Fig. 2 is a side view of the same; Fig. 3 is a detail of the tripping switch; and Fig. 4 is a diagram of the circuit connections.

Referring to the drawings, it will be seen that in the particular arrangement shown I employ four windings 10, 11, 12 and 13 arranged symmetrically about a center. These coils, as shown in Fig. 4, are connected in pairs, windings 10 and 12 being in series in one phase while windings 11 and 13 are in series in another phase. These windings have a magnetic structure including the usual magnetic cores 14 mounted on a base of magnetic material 15 which in turn is mounted upon the insulating support 16. Cooperating with these coils is a non-magnetic, metallic disk 19 rotatably mounted to rotate about the center 20. The disc is preferably of copper since copper has a relatively low resistance although the invention is not necessarily limited to the use of a copper disc. As will be well understood, this copper disk will be rotated by the rotating field set up by the windings 10 to 13 when the latter are connected in a polyphase circuit, as shown in Fig. 4. This form of construction is well known in the art and forms no part of my present invention.

One of the principal features of my invention resides in the provision of improved means whereby this copper disk may be caused to rotate in the opposite direction from that in which it runs when connected to a polyphase circuit, in case of the failure of one of the phases of the polyphase circuit. In the particular arrangement shown, this means includes a magnetic member 21 which in the case of a three-phase circuit is responsive to single-phase energization to rotate in the opposite direction to the normal direction of rotation of the disk. As shown this magnetic member 21 is provided with four projections forming pole pieces which cooperate with the pole pieces of the magnets, they being arranged symmetrically 90 degrees apart the same as the coil arrangement. This member will be attracted by the magnets and, whenever the pole pieces are displaced from the magnet pole pieces, there is a tendency to return the member to the position of least magnetic reluctance which will be that in which the poles of the member are directly over the poles of the magnet. When this member is secured to the copper disk, therefore, and the copper disk is rotated due to the rotating field of the polyphase circuit, there is a torque upon the member which in turn produces an additional torque on the copper disk. By proper arrangement this additional torque will be opposed to the normal torque on the disk due to the rotating field. This additional torque is analogous to what is known as the "tooth torque" in an induction motor. Normally, of course, this so-called "tooth torque" is overcome by the torque due to the rotating field. If, however, one of the phases of the polyphase circuit should be opened so that the rotating field will no longer exist, the torque due to the presence of the magnetic member will prevail and cause the disk to be moved to the opposite direction.

Figure 4:
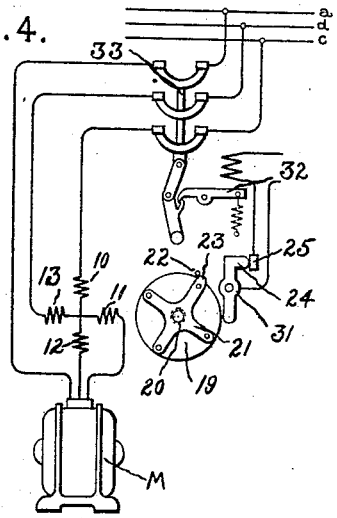

As shown in Fig. 4, a stop 22 is provided for limiting the rotation of the disk due to the rotating field. When, therefore, the coils 10 to 13 are connected to a polyphase circuit and a rotating field set up, the disk 19 will be rotated in a counter-clockwise direction until the stop 22 prevents further rotation. The stop is so located that the rotation of the disk is slight so as not to cause too great a displacement of the magnetic member 21 from the pole pieces. As shown in Fig. 4, this rotation is only a few degrees so that the pole pieces of the magnetic member are only slightly displaced from the pole pieces of their corresponding magnets and the magnetic attraction and the single phase opposing torque will be adjusted to be of sufficient magnitude to cause the return of the magnetic member. Fig. 4 shows the parts in the position which they assume when the magnets are energized by the polyphase circuit. If, however, any one phase of the polyphase circuit is opened, the torque on the copper disk due to the rotating field will disappear, allowing the torque due to the single-phase energization, namely, the attraction between the pole pieces of the magnet and the pole pieces of the magnetic member 21, to prevail and return the member in a clockwise direction. As shown in Fig. 4, one of the pole pieces of the magnetic member 21 projects farther than the others, as shown at 23, so as to act to trip a switch and open the circuit.

Figs. 1, 2 and 3 show a form of switch which may be used for opening the circuit. This simply consists of a movable switch member 24 cooperating with stationary contacts 25. Switch member 24 is normally in open position, shown in Fig. 3, and is moved to closed position by pressing the button 26 which, through the toggle arrangement shown, moves the switch member 24 into engagement with the contacts 25. A latching member 27 cooperates with a projection 28 to hold the switch closed against the tension of the spring 29. Latching member 27 is provided with a beveled portion 30 which is engaged by the projection 23 of the magnetic member 20 when the latter moves in a clockwise direction and trips the switch to cause it to move to the open position. This switch, shown in Fig. 3, is represented diagrammatically in Fig. 4 at 31. As shown, this switch 31 controls the circuit of no voltage release magnet 32 which in turn trips a circuit breaker 33 in the main circuit so as to open the entire polyphase circuit.

As thus constructed and arranged, it will be seen, particularly by reference to Fig. 4, that when the motor M is connected to the polyphase circuit $a\ b\ c$ through the windings 10 to 13, the rotating member comprising the copper disk 19 and the magnetic member 21 will assume the position shown in Fig. 4. The rotating member and the magnetic member are thus normally out of operative relation with the switch mechanism and are maintained out of operative relation therewith while polyphase energization of the magnetic structure continues. If, however, one phase should be opened at any time while the motor is running, the disk will be rotated in a clockwise direction into operative relation with the switch mechanism to open the switch 31, which will cut off the supply circuit from the motor. The switch 31 will be held open so long as the polyphase circuit is open, since the projection 23 will be adjacent the latch 30 of switch 31. Furthermore, if one of the phases is open, the circuit breaker cannot be latched closed, since the latch 30 will not be released by the projection 23 until the polyphase circuit is established to rotate the disk 19 in a counter-clockwise direction. It will be observed that the coils are only in two phases of the circuit, but the operation will take place even if a phase is opened which does not include the coils, since the interruption of this phase leaves only a single phase with no rotating field. In this case all four coils are active to return the rotating member in the clockwise direction. If, however, one of the phases containing the coils opens, then only two of the coils are active to cause this return movement. There will then be less torque tending to return the member in this latter case, but, since the parts are designed so as to give sufficient returning torque with two coils, it is of no importance which phase opens, since the same result will occur in each case. At least a portion of the windings is thus always effective to open the polyphase circuit. Obviously the same result will occur upon a reversal of phase, since in that case the reversal would cause the copper disk to rotate in the opposite direction and the returning torque would then be acting in the same direction as that due to the rotating field, instead of against it.

It will be seen, therefore, that I have provided an arrangement which will operate to open the motor circuit under all conditions which may occur. The device is simple and positive in its action and due to the use of series windings will be cheaper than one in which shunt coils are used.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A device for opening a polyphase circuit upon the opening of one of its phases comprising series windings in less than all the phases and means whereby upon the opening of any of the phases, all of the phases will be opened.

2. A device for opening a polyphase circuit upon the opening of one of its phases comprising a plurality of windings energized by said circuit, a member operated by the rotating field set up by said windings, and a magnetic element movable with reference to said windings and arranged to cause a different operation of said member upon less than normal phase excitation of the windings.

3. A device for opening a polyphase circuit upon the opening of one of its phases comprising a plurality of spaced apart windings energized by said circuit, a non-magnetic metallic disk rotated by the said windings and a movable magnetic member having spaced apart portions corresponding to said windings and cooperating therewith to cause a reverse rotation of the disk upon less than normal phase excitation of said windings.

4. A device for opening a polyphase circuit upon the opening of one of its phases comprising a plurality of windings energized by said circuit, magnetic pole pieces therefor, a non-magnetic metallic disk rotated by said pole pieces and a magnetic member having armature portions cooperating with said pole pieces to cause a reverse rotation of the disk upon less than normal phase excitation of said windings.

5. A device for opening a polyphase circuit upon the opening of one of its phases comprising a plurality of windings energized by said circuit, magnetic pole pieces therefor, a non-magnetic metallic disk rotated by said pole pieces and a magnetic member secured to said disk having armature portions cooperating with said pole pieces to cause a reverse rotation of the disk upon less than normal phase excitation of said windings.

6. A device for opening a polyphase circuit upon the opening of one of its phases comprising an electromagnetic structure for producing a rotating field; a member rotated thereby and a magnetic element associated with said structure and said member for causing a torque to be exerted on said member in opposition to that due to the rotating field whereby said opposing torque will prevail and rotate the member when a phase of the polyphase circuit is opened, the said element being mounted for movement with reference to said structure for adjusting said opposing torque.

7. A device for opening a polyphase circuit upon the opening of one of its phases comprising switch mechanism for controlling the circuit, an electromagnetic structure having a plurality of spaced apart poles with windings thereon for producing a rotating field when the windings are energized from the polyphase circuit, a non-magnetic metallic rotatable member normally out of operative relation with the said switch mechanism and arranged to be under the influence of said rotating field to have a torque set up therein which maintains the member out of operative relation with the said switch mechanism while polyphase energization of the said structure continues, and a magnetic member having a plurality of spaced apart portions corresponding to said poles cooperating with the said rotatable member to set up a torque in opposition to the torque due to the said rotating field, the torque due to the said magnetic member persisting after a phase of the polyphase circuit is opened to operate the said rotatable member into operative relation with the said switch mechanism to effect the opening of the polyphase circuit.

8. An electromagnetic device for alternating current circuits comprising an electromagnetic structure having a plurality of symmetrically disposed pole pieces and a plurality of dephased windings for producing a rotating field, a non-magnetic member rotated by said field, and a magnetic member having a plurality of symmetrically disposed arms corresponding with the said pole pieces for setting up another torque in said member by single phase energization of the magnetic structure.

9. An electromagnetic device for polyphase alternating current circuits comprising a plurality of windings for producing a rotating field, a stop, a rotatable member held in engagement with said stop by the torque set up in the member by said field upon normal phase energization of said windings, and a magnetic element cooperating with said member for causing the windings to set up a single phase counter torque in the member, the said counter torque persisting upon a failure of a portion of the phases of the circuit to effect operation of the member out of the engagement with said stop position.

10. An electromagnetic device for polyphase alternating current circuits comprising a plurality of windings arranged to be each connected in series relation with a separate conductor of the said circuit for producing a rotating field, spaced apart magnetic pole pieces for said windings, a stop, a rotatable member held in engagement with said stop by the torque set up by said field upon polyphase energization of said windings, and a magnetic element having spaced apart portions corresponding to said pole pieces and cooperating with said member and said pole pieces for causing to be set up in said member a single phase counter torque of less value than the said polyphase torque, whereby upon the failure of a portion of the phases, the said single phase counter torque is effective to cause operation of the member out of the biased position.

In witness whereof, I have hereunto set my hand this 10th day of November, 1921.

BENJAMIN W. JONES.